United States Patent [19]

Bowman

[11] Patent Number: 4,881,719

[45] Date of Patent: Nov. 21, 1989

[54] GATE VALVE

[76] Inventor: Jeffrey M. Bowman, 6920 SW. 2nd Ave., Portland, Oreg. 97219

[21] Appl. No.: 248,050

[22] Filed: Sep. 23, 1988

[51] Int. Cl.⁴ .............................................. F16K 3/02
[52] U.S. Cl. ...................................... 251/328; 251/326
[58] Field of Search ........................ 251/326, 328, 329

[56] References Cited

U.S. PATENT DOCUMENTS

| | | | |
|---|---|---|---|
| 2,669,416 | 2/1954 | Hilton | 251/328 |
| 2,829,862 | 4/1958 | Wey | 251/328 |
| 2,851,051 | 9/1958 | Englert et al. | 137/242 |
| 3,784,158 | 1/1974 | Cave | 251/327 |
| 3,897,043 | 7/1975 | McBain et al. | 251/328 |
| 4,009,727 | 3/1977 | Bailey | 251/326 X |
| 4,051,863 | 10/1977 | Still | 251/328 X |
| 4,112,969 | 9/1978 | Still | 137/454 |
| 4,201,365 | 5/1980 | Paptzun | 251/328 |
| 4,206,905 | 6/1980 | Dobler | 251/328 |
| 4,377,274 | 3/1983 | Mayhew | 251/327 |
| 4,522,224 | 6/1985 | Stalder | 137/242 |
| 4,585,023 | 4/1986 | Almada | 137/240 |
| 4,603,864 | 8/1986 | Raftis | 277/12 |
| 4,610,430 | 9/1986 | Besnard et al. | 251/327 |
| 4,688,597 | 8/1987 | Clarkson | 137/375 |
| 4,693,447 | 9/1987 | Perez | 251/129 |

FOREIGN PATENT DOCUMENTS 1105893 8/1953 France ................................. 251/328
99375 5/1961 Netherlands ....................... 251/328

Primary Examiner—John Fox
Attorney, Agent, or Firm—Eugene M. Eckelman

[57] ABSTRACT

A gate valve body member 10 and plastic liner 12 define a flow passage 24 therethrough which communicates with a pair of pipes 34 bolted to the gate body. The liner has a bottom seating surface engageable by the gate 22 and extending from a central point outward to the sides of the flow passage. A top opening recess 54 in the liner 12 receives the gate in a slidable sealing fit. The recess and gate are wider than the flow passage and defining walls of the gate receiving recess terminate at the bottom intermediate the center and sides of the seating surface to provide side sealing and pressure backing support in both directions of flow for a lower portion of the gate and particularly a support below the horizontal center line of the flow passage. The seating surface includes a central arcuate surface portion and straight surface portions joined therewith and extending outwardly to the sides, the bottom edge of the gate being configured to fit the arcuate and straight surface portions. The bottom termination of the recess is approximately at the juncture between the central arcuate surface portion and the straight surface portions. Portions of the recess defining walls are relieved to reduce friction of sliding movement of the gate.

8 Claims, 3 Drawing Sheets

U.S. Patent  Nov. 21, 1989  Sheet 3 of 3  4,881,719
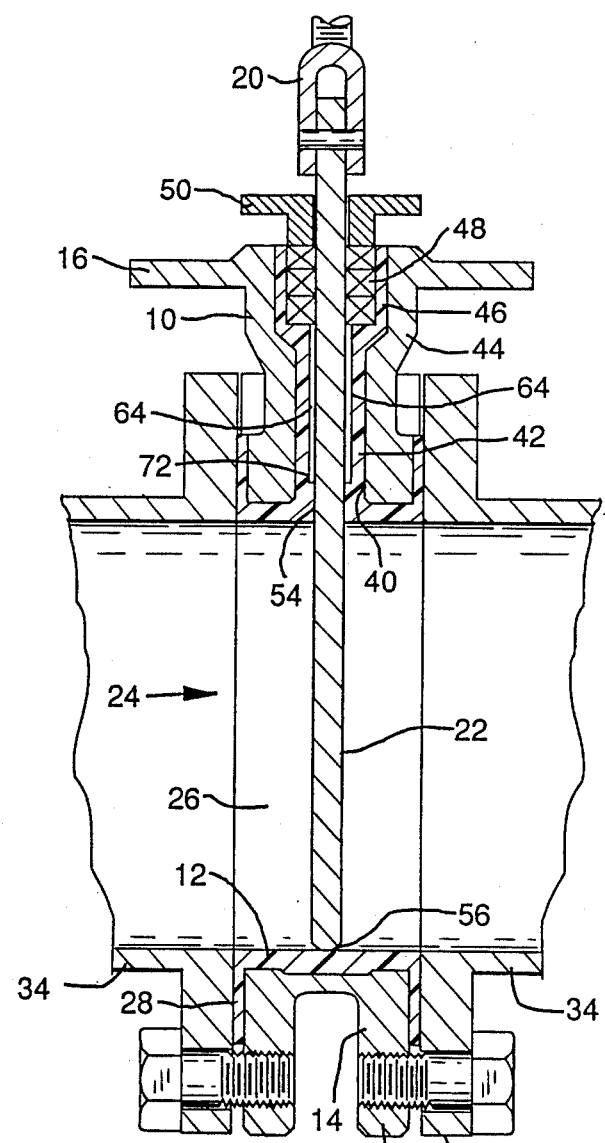
FIG. 3
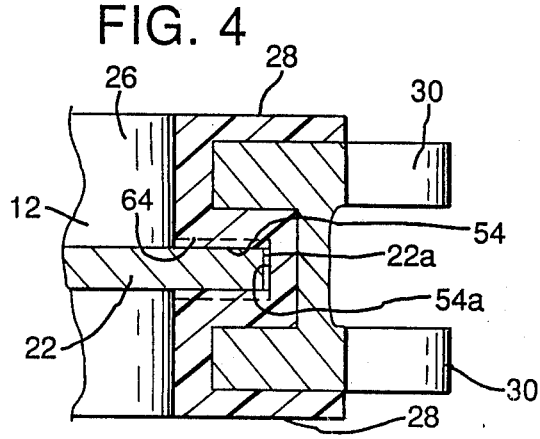
FIG. 4
FIG. 5

4,881,719

GATE VALVE

BACKGROUND OF THE INVENTION

This invention relates to new and useful improvements in gate valves of the type having a wear and corrosion resistant lining.

Gate valves are in common use for controlling flow media such as slurries and corrosive fluids. These valve have a flow passage therein controlled by a plate-like gate slidable in a recess in the liner. Gate valves often are used to control flow of slurries or corrosive fluids containing abrasive solids and are lined with a resilient, tough wearing and corrosion resistant material such as polyurethane or polyethylene. Low pressure gate valves are readily sealed, namely, by the closing thrust of the gate and by a sealed fit in liners or seals. High pressure valves on the other hand create more problems in that sealing is more difficult and high pressures can bend the gate at its lower end. When there is side backing support for the gate to reinforce it against high pressure, a large amount of friction may exist for opening and closing he gate. Also, side supports on any gate, whether in low or high pressure systems, create pockets or obstructions which can hinder the free flow of material. For best performance and all around functioning, it is desired (1) that the structure of the gate valve when open provide no obstruction through the flow passage so that there will be efficient flow and minimum wear; (2) that the gate have a good sealing function in the valve body for both low and high pressure flow; (3) that the gate have backing support at its lower portion so that high pressure conditions in the fluid, preferably from either direction, do not damage the gate; and (4) that the friction of gate movement be low enough so that the gate can be readily opened and closed. It is also desired that particles in the fluid do not gather in the valve to the extent that they jam the gate. This combination of structural features has not been fully achieved heretofore.

Considering prior patented structures, for example, reference is made to U.S. Pat. Nos. 2,851,051 and 4,603,864. Although no doubt effective to an extent in their operation, portions of the gate seal form obstructions in the flow passage and thus minimize efficient fluid flow. Also, heavy particles can jam at the seal and abrasive slurries will cause undue wear. Structure shown in U.S. Pat. No. 4,112,969, has a flow passage in the body member which is unobstructed, but use with high presure is not possible because there is no backing support for the gate at a lower portion thereof and the gate will warp under such pressure.

U.S. Pat. Nos. 2,669,416 and 4,201,365 provide backing and/or sealing support for the gate but in order to do this such support or sealing means form an obstruction in the flow passage flow. Also, backing support in these patented structures is only effective in one direction of flow. U.S. Pat. Nos. 3,784,158, 3,897,043, 4,377,274, 4,522,224, and 4,693,447 employ gate valve seals that use a groove associated with the sealing end of the gate for accomplishing the sealing function. This type of grooved structure has the disadvantage of allowing particles to collect therein and hinder opening and closing of the gate and proper seating.

SUMMARY OF THE INVENTION

According to the present invention and forming primary objectives thereof, a gate valve is provided that amounts to a substantial improvement over existing valves in that it has a structure that makes it highly versatile in use, namely, its flow passage when open allows movement of flow media therethrough without obstruction in the area adjacent the bottom of the flow passageway, thus permitting efficient flow with minimum wear; that provides an effective seal in both directions and at both low and high pressures; that has suitable backing support for the gate to prevent damage to the date from high pressures; and that has a liner and gate construction such that the gate can be readily opened and closed without excessive locking friction and interference from heavy material which may settle out of the flow media.

In carrying out the objectives of the invention, the gate valve of the invention comprises a body having an opening to which is bonded a plastic liner defining a flow passage through the valve. The plastic liner has a bottom seating surface engageable by the bottom edge of a platelike gate slidable in a top opening recess. As an important feature of the invention, the recess and gate are wider than the flow passage and the gate receiving recess extends to a point adjacent a lower portion of the gate and at least to a point below the horizontal center line of the flow passage, for providing side sealing and backing support for the lower end of the gate to prevent damage to the gate from high pressures. That is, the side recesses extend down and join with the bottom seating surface at a point between the center of the seating surface and the side thereof whereby a seal is formed at the bottom by the thrust of the gate valve and the sealing transfers to the side recesses under the influence of the line pressure. Backing support for the gate from line pressure is provided in both directions. Further yet, the lower portion of the flow passage defined by the liner comprises a smooth, uninterrupted opening devoid of obstructions. Upper portions of the recess are relieved for minimizing opening and closing friction of the gate.

The invention will be better understood and additional objects and advantages will become apparent from the following description taken in connection with the accompanying drawings.

BRIEF DESCRIPTION OF THE DRAWINGS

FIG. 3 is a vertical sectional view taken similar to the cutaway view of FIG. 1, and FIGS. 4 and 5 are fragmentary enlarged sectional views taken on the lines 4—4 and 5—5 of FIG. 2.

DETAILED DESCRIPTION OF A PREFERRED EMBODIMENT

Figure 1:
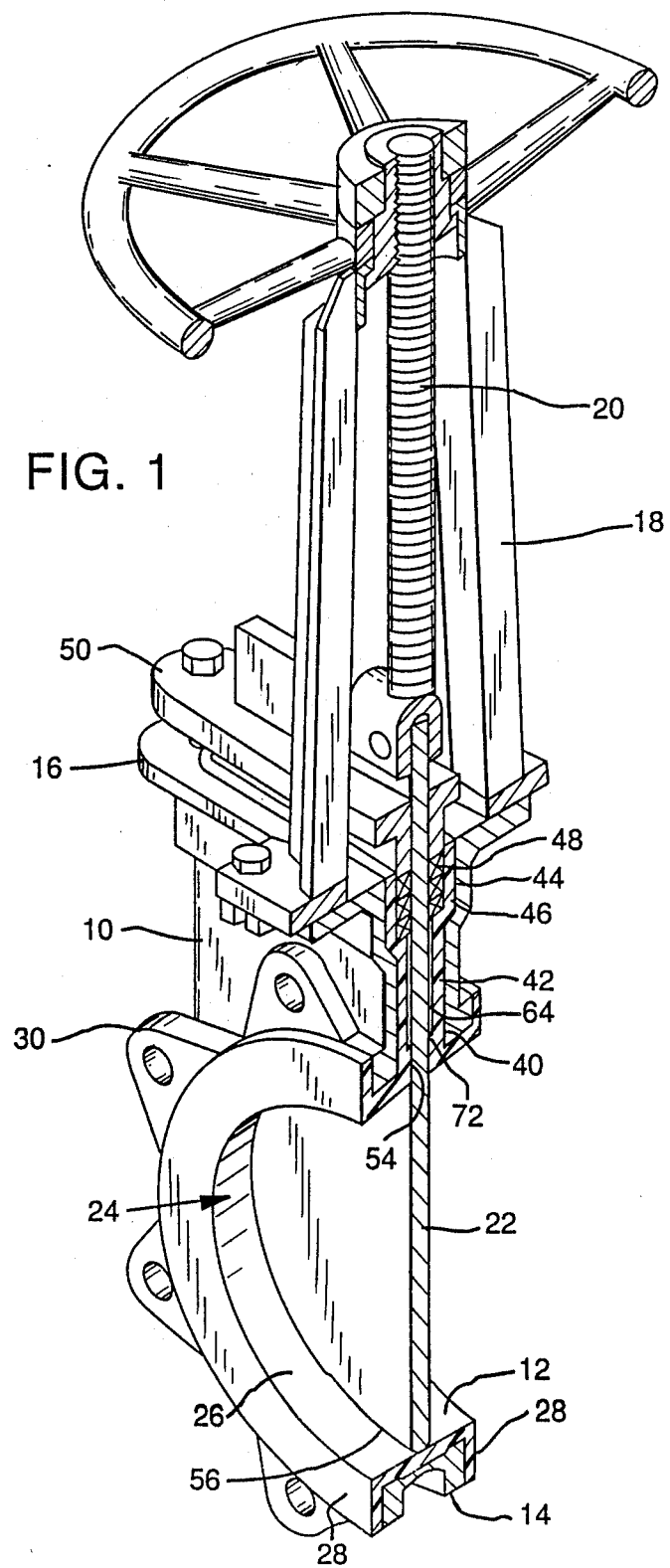
FIG. 1 is an isometric cutaway view of the present gate valve.

With particular reference to the drawings, the gate valve of the invention comprises a metal valve body 10 and an inner plastic liner 12. Liner 12 can be constructed of a tough resilient plastic such as polyurethane, polyethylene, or other plastic type material which as is well known has good resistance to abrasion and/or corrosion. Although valve body 10 can be constructed of two or more pieces and assembled while bonding or otherwise securing the liner to it, it preferably is cast or otherwise formed as a single member. In this instance liner 12 is injection molded to the metal body. Valve body 10 has a lower annular portion 14 and a flanged upper extension 16 that supports upright standards 18 of operating mechanism 20 for a thin plate-like gate 22 for controlled flow of liquid.

Liner 12 is U-shaped in cross section and in its integration with the body member defines a flow passage or port 24. It is U-shaped in cross section in this lower portion and forms a smooth longitudinal flow-passage surface 26. The right angle portions 28 thereof have vertical outwardly directed smooth surfaces arranged for bolted and sealed connection between radially projecting ears 30 and 32 on the valve body 10 and conduits 34, respectively, FIG. 3.

Valve body 10 has a top opening slot 40 in its upper extension 16, and such slot receives in bonded relation an upper integral extension 42 of liner 12. Slot 40 has an offset portion 44 in which an offset portion 46 of the liner is bonded. Offset portion 46 encloses seals 48 of a stuffing box 50. The liner has a top opening gate-receiving recess 54 in which the gate slides.

Figure 2:
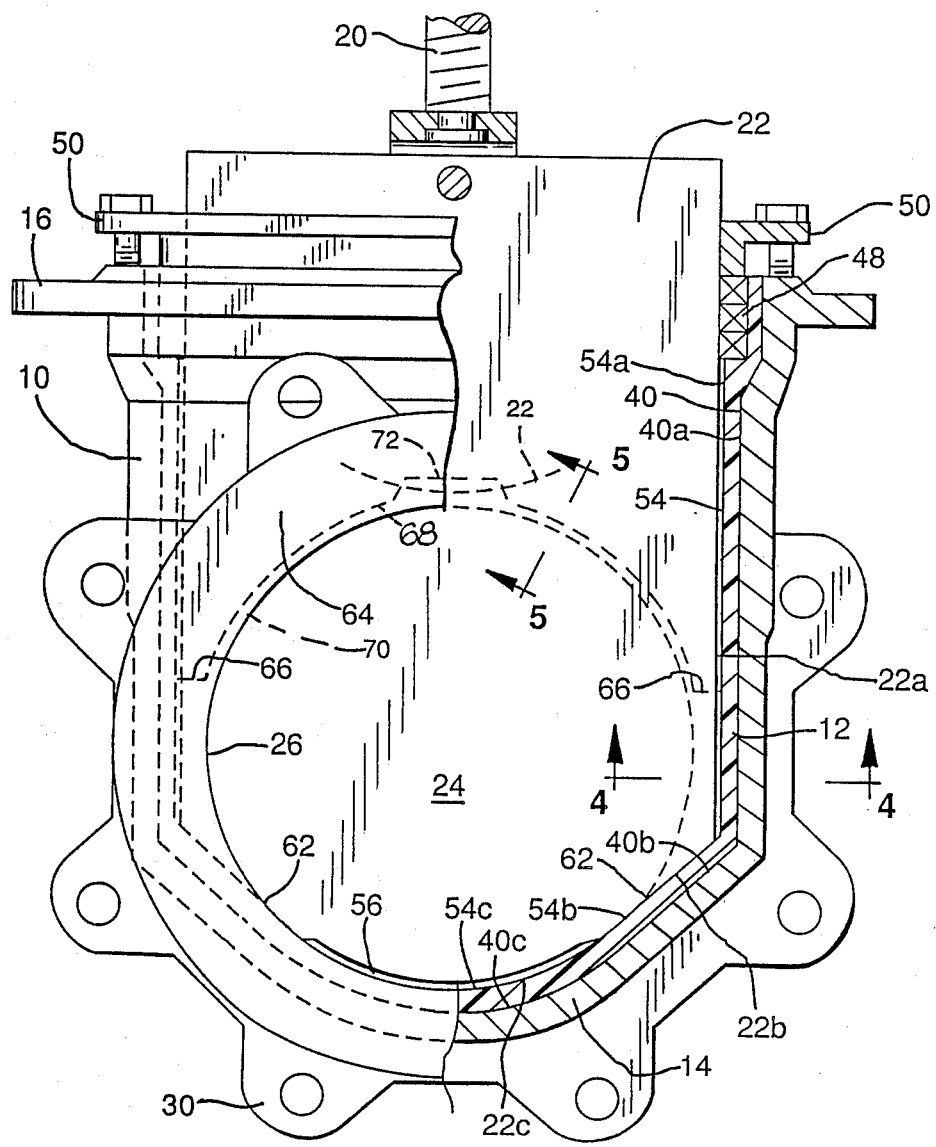
FIG. 2 is a fragmentary face view of the valve with a portion thereof being broken away.

As an important concept of the invention, the valve body 10, liner 12 and gate 22 have a particular and novel structure contributing to the performance of the objectives named herein. With particular reference to FIG. 2, the slot 40 in the valve body is defined by vertical side wall portions 40a and downwardly angled straight portions 40b leading from the lower end of the side wall portions 40a at a point considerably below the horizontal center line of the flow passage 24. Downwardly angled portions 40b lead into a central rounded portion 40c. The lateral distance between the side wall portions 40a of slot 40 is substantially wider than the width of the flow passage 24.

The recess 54 in the liner 12 which slidably receives the gate is shaped laterally similar to the slot 40 in the valve body, namely it is defined by side wall portions 54a, downwardly angled straight portions 54b, and a connecting central rounded portion 54c.

Gate 22 is contoured laterally precisely the same as the liner recess 54, namely, it has side edges 22a leading along the slot edges 54a, downwardly angled straight bottom edges 22b leading along and arranged to abut angled recess portions 54b, and a central rounded portion 22c extending between angled portions 54b and arranged to abut bottom rounded liner portion 54c. The rounded edge portion 22c of the gate has side bevels 56.

In view of the identical shape of the bottom edges 22b and 22c of the gate and the adjacent liner seating surfaces 54b ad 54c, respectively, the gate has sealing engagement with the liner in these areas when forced down by the gate actuating mechanism. As best seen in FIGS. 2 and 4, the liner is wider than the flow passage 24 and its gate receiving recess 54 thus provides substantial gate confinement at the sides and more particularly a confinement that leads downwardly to a juncture point 62 in the flow passage, for example, a point inwardly from the sides on the straight wall portion 54b of the recess 54. The junctures 62 comprise points at which the recess wall portions 54 are tangentially disposed relative to the flow passage 24 and importantly considerably lower than the horizontal center line of the flow passage.

Opposite faces of the gate have a slidable sealing fit in recess 54, and to reduce opening and closing friction between the gate 22 and the recess, and to assist seating in the upper portion of the valve, the recess has an upper relief portion 64 extending across the gate recess down to lower points 66 located a short distance above the horizontal center line of the flow passage. This relief portion extends along a defining arc 68 thereof disposed a short distance radially outward from the flow passage to maintain a narrow sealing strip 70 of the recess 54 for the gate at this upper portion. A short segment 72 of the recess 54 at the top is not relieved whereby such upwardly extending wall portions formed thereby serve as a guide for the gate when it is in its fully open postion, as shown fragmentarily in broken lines in FIG. 2. As also seen in FIG. 2, recess 54 is of a width to provide clearance at the sides of the gate to also contribute to ease of opening and closing.

In operation, the gate is movable up and down in its recess 54 for controlling the flow of fluid through the flow passage 24. The gate has face surface sealing engagement with confining wall portions of the recess 54 starting upwardly from juncture points 62. This sealing extends along the sides to points 66 and then along the arcuate strip 70 around the upper portion of the flow passage. The bottom edge of the gate seals against the surfaces 54b and 54c of the liner by the thrust of the gate actuating mechanism and the sealing in the other areas is accomplished by a close tolerance fit of the gate in the recess and by line pressure on the upstream side. The narrow sealing strip 70 causes good sealing on the downstream side due to higher seating stress between the gate and this narrow strip.

Since the gate has face sealing engagement with the liner along its sides and partially along a bottom edge and also since engagement thereof in the recess is substantially below the center line of the flow passage, the gate has backing support on the downstream side against high pressure that may exist in the flow passage. More particularly, the side recesses extend down and join with the bottom seating surface at points 62 between the center of the seating surface and the sides and a seal is formed at the bottom by the thrust of the gate and by a sealing that transfers to the side recesses under the influence of line pressure. The gate thus cannot bend. The structure accomplishes the same function in either direction of flow and thus is unidirectional. The backing support for the gate is radially beyond the plane of the flow passage and thus there are no protrusions within the port that can hinder flow and induce wear.

The valve is self-clearing since any solid particles that may lodge in the side gate confining areas will fall or be pushed by the gate down to the lower ends of these areas and then flushed out. Straight wall portion 54b is sloped sufficiently, such as approximately 45°, to allow material deposited by the flow media in the recess above juncture point 62 to slide down below such juncture point and out of the recess to alllow proper seating when the gate is closed. If any fluid or solid particles escape upwardly past the sealing portion 70, they will collect in the relief portion 64. Such fluid or particles will fall down into the flow passage the next time the gate is opened.

Thus, the present invention comprises a highly versatile valve, namely, it is bidirectional and can be used in low or high pressure systems. Also, the flow passage and the gate is unobstructed by any type of gate backing support or seals, and efficient flow is accomplished. Also, the liner has long wear. The gate has minimum friction engagement with the liner and is readily raised and lowered.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A gate valve for controlling the flow of fluid between a pair of pipes, comprising:

a body member having upper and lower portions, an opening in the lower portion of said body member, a gate having a bottom sealing edge, gate operating means for said gate on the upper portion of said body member, a plastic liner secured to said body member in said opening and having upper and lower and side defining portions forming a valve flow passage having opposite side portions, a bottom seating surface on said liner engageable by said gate and having a center portion with upwardly and outwardly extending side portions, and wall means defining a top opening, downwardly extending recess in said liner receiving said gate in a slidable surface sealing fit, said recess and gate being wider than said flow passage and the wall means of said recess terminating at a bottom portion of said flow passage above the center portion and adjacent the upwardly disposed side portions of said seating surface to provide side sealing and pressure backing support for said gate from the bottom of said wall means and upwardly of the gate.

2. The gate valve of claim 1 wherein the termination of said recess wall means at the bottom is below the horizontal center line of said flow passage.

3. The gate valve of claim 1 wherein defining wall means of said recess provide sealing and pressure backing support for said gate in both directions of flow.

4. The gate valve of claim 1 wherein said center and upwardly extending portions of said seating surface comprise a central arcuate surface portion and straight surface portions, respectively, the bottom edge of said gate being configured to fit said arcuate and straight surface portions, said bottom termination of said recess being approximately at the juncture between said central arcuate surface portion and the said straight surface portion.

5. The gate valve of claim 1 wherein said center and upwardly extending portions of said seating surface comprise a central arcuate surface portion and straight surface portions, respectively, the bottom edge of said gate being configured to fit said arcuate and straight surface portions, said bottom termination of said recess being approximately at the juncture between said central arcuate surface portion and the said straight surface portion, the bottom edge of said gate in said central arcuate portion having a beveled edge.

6. The gate valve of claim 1 wherein a portion of said recess wall means spaced from said flow passage is relieved to reduce the friction of sliding movement of said gate in said recess.

7. The gate valve of claim 1 wherein said upper and side defining portions of said recess wall means are relieved except for an arcuate strip adjacent an upper portion of said flow passage and an extension at the uppermost portion of said strip which forms a guide for said gate when in its open position.

8. A gate valve for controlling the flow of fluid between a pair of pipes, comprising:

a body member having upper and lower portions, an opening in the lower portion of said body member, a gate having a bottom sealing edge and outer side edges, gate operating means on the upper portion of said body member, a plastic liner secured to said body member in said opening and having upper and lower and side defining portions forming a valve flow passage having bottom and opposite side portions, a bottom seating surface on said liner having opposite sides and being engageable by the bottom edge of said gate and having a center portion with upwardly and outwardly extending side portions, and wall means defining a top opening, downwardly extending recess in said liner receiving said gate in a slidable surface sealing fit, said recess and gate being wider than said flow passage to provide side sealing and pressure backing support for a lower portion of said gate in both directions of flow, said bottom seating surface of said liner being disposed in the plane of the bottom portion of the flow passage to form a smooth unobstructed surface, said recess extending down and joining with side portions of said bottom seating surface whereby a seal is formed at the bottom by downward thrust of said gate and at the sides by a sealing support that transfers to said sides from said seating surface under the influence of line pressure.

* * * * *